(12) United States Patent
Guha et al.

(10) Patent No.: US 9,682,511 B2
(45) Date of Patent: Jun. 20, 2017

(54) AIR BONDING PROCESS

(71) Applicant: CONTINENTAL STRUCTURAL PLASTICS, INC., Auburn Hills, MI (US)

(72) Inventors: Probir Kumar Guha, Troy, MI (US); Brad Haskell, Auburn Hills, MI (US); Hugh C. Foran, Auburn Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 166 days.

(21) Appl. No.: 14/764,381

(22) PCT Filed: Jan. 29, 2014

(86) PCT No.: PCT/US2014/013660
§ 371 (c)(1),
(2) Date: Jul. 29, 2015

(87) PCT Pub. No.: WO2014/120813
PCT Pub. Date: Aug. 7, 2014

(65) Prior Publication Data
US 2015/0367561 A1     Dec. 24, 2015

Related U.S. Application Data

(60) Provisional application No. 61/758,064, filed on Jan. 29, 2013.

(51) Int. Cl.
*B29C 65/10* (2006.01)
*B29C 65/48* (2006.01)
(Continued)

(52) U.S. Cl.
CPC ............ *B29C 65/483* (2013.01); *B29C 65/10* (2013.01); *B29C 65/7847* (2013.01);
(Continued)

(58) Field of Classification Search
CPC ...................................................... B29C 65/10
See application file for complete search history.

(56) References Cited

U.S. PATENT DOCUMENTS 2,423,237 A * 7/1947 Haslacher ............... B29C 65/10
                                                                156/282
3,210,227 A * 10/1965 Shichman ............. B29C 43/305
                                                                156/308.8
(Continued)

*Primary Examiner* — Jeff Aftergut
(74) *Attorney, Agent, or Firm* — Avery N. Goldstein; Blue Filament Law PLLC

(57) ABSTRACT

Pressurized air is conveyed through a manifold into contact with the first member via apertures having hole diameters of from 0.8 to 2.5 mm that are spaced apart at a distance of from 10 to 30 mm along the manifold to achieve a turbulent air flow pattern with a Reynolds number of greater than 2200 at a temperature of between 150 and 315° C. and at an air pressure between 0.5 and 10 pounds per square inch (psi) over ambient pressure onto the outer surfaces of the first member and the second member for heat curing a curable adhesive between the members to achieve adhesive cure in 60 to 90 seconds and free of any bond-line read-out visible to an unaided normal human eye.

13 Claims, 4 Drawing Sheets

(51) Int. Cl.
*C09J 5/06* (2006.01)
*B29C 65/00* (2006.01)
*B29L 31/30* (2006.01)
*B29C 65/18* (2006.01)
*B29C 65/26* (2006.01)
*B29C 65/78* (2006.01)
*B29C 65/04* (2006.01)
*B29C 35/04* (2006.01)
*F16B 11/00* (2006.01)

(52) U.S. Cl.
CPC ........ *B29C 66/0342* (2013.01); *B29C 66/112* (2013.01); *B29C 66/131* (2013.01); *B29C 66/51* (2013.01); *B29C 66/721* (2013.01); *B29C 66/81* (2013.01); *B29C 66/8266* (2013.01); *B29C 66/919* (2013.01); *B29C 66/9141* (2013.01); *B29C 66/929* (2013.01); *B29C 66/9241* (2013.01); *B29C 66/944* (2013.01); *B29C 66/949* (2013.01); *C09J 5/06* (2013.01); *B29C 35/045* (2013.01); *B29C 65/04* (2013.01); *B29C 65/18* (2013.01); *B29C 65/26* (2013.01); *B29C 65/4835* (2013.01); *B29C 65/7841* (2013.01); *B29C 66/1122* (2013.01); *B29C 66/742* (2013.01); *B29L 2031/30* (2013.01); *B29L 2031/3044* (2013.01); *F16B 11/006* (2013.01); *Y10T 156/10* (2015.01)

(56) References Cited

U.S. PATENT DOCUMENTS

| | | | |
|---|---|---|---|
| 3,843,480 A | * | 10/1974 | Dreher ............... B32B 37/00 156/182 |
| 4,612,149 A | | 9/1986 | Iseler et al. |
| 4,941,936 A | | 7/1990 | Wilkinson et al. |
| 5,223,684 A | | 6/1993 | Li et al. |
| 5,401,154 A | | 3/1995 | Sargent |
| 5,554,252 A | * | 9/1996 | Foran ............... B29C 65/10 156/311 |
| 6,019,152 A | * | 2/2000 | Haynes ............... D04H 1/54 156/433 |

* cited by examiner

AIR BONDING PROCESS

RELATED APPLICATIONS

This application claims priority benefit of U.S. Provisional Application Ser. No. 61/758,064 filed Jan. 29, 2013; the contents of which are hereby incorporated by reference.

FIELD OF THE INVENTION

The present invention relates generally to a bonding process and in particular, to process for bonding automotive fiber reinforced plastic (FRP) members together.

BACKGROUND

Various techniques are currently employed for bonding fiber reinforced plastic (FRP) members together for use in automotive body applications such as, but not limited to, hoods, doors, bumpers, and the like. There has been an outgrowth in the number of apparatuses and methods available for producing bonded FRP assemblies due to the growing trend in the automotive industry to replace heavier metal components with plastic assemblies. These assemblies are typically bonded by heating an adhesive placed between the mating surfaces of two FRP members to a temperature exceeding its curing temperature.

Prior art FIGS. 1-3 illustrate in a simplified manner, examples of well-known bonding techniques that use heat to bond an FRP assembly consisting of FRP members 10 and 12 with adhesive 14 placed there between. FIG. 1 illustrates dielectric heating apparatus 16 that produces radio frequency electrostatic fields between electrode 18 and block member 20. The electrostatic fields quickly heat adhesive 14 to a temperature above its curing temperature to thereby bond FRP members 10 and 12. Commonly assigned U.S. Pat. No. 4,941,936 to Wilkinson et al. and U.S. Pat. No. 4,941,937 to Iseler et al. discloses examples of dielectric heating techniques which are hereby incorporated herein by reference. Dielectric heating techniques have the advantage of reducing cycle times along with the accompanying disadvantage of heating an FRP assembly in a manner that is difficult to control and maintain.

Prior art FIG. 2 illustrates bonding apparatus 22 that utilizes cartridge heaters 28 for heating metal block members 24 and 26. Block members 24 and 26 in turn heat the air flowing through air circuits 30, a portion of which flows through openings 32 for heating adhesive 14 between FRP members 10 and 12. One disadvantage with this type of bonding technique is that it requires a large supply of compressed air to operate efficiently.

Prior art FIG. 3 illustrates bonding apparatus 34 that utilizes heated steam and/or hot water flowing through passages 40 for heating metal block members 36 and 38. Block members 36 and 38 in turn heat adhesive 14 between FRP members 10 and 12. This bonding technique has the disadvantage of requiring a high cycle time when compared to the bonding techniques illustrated in prior art FIGS. 1 and 2.

When bonded FRP assemblies are used in exterior automotive body applications, it is of the utmost importance that the bonding technique employed does not adversely affect the surface qualities of the exterior FRP members and that the technique provides even bonding notwithstanding the size of the FRP members.

Other previous techniques, such as U.S. Pat. No. 5,554,252, proposed an improved process, however leaving several shortcomings of its own. For instance, conventional methods are unable to get the sheet molding compound (SMC) substrate to an adequately high temperature to provide adequate handling strength to the bonded assembly after 60 to 90 seconds in the bonding fixture. To obtain a lower cycle time more expensive bonding fixtures would be required than what is used with current hot air bonding techniques. In addition, conventional methods have inferior rate of heat transfer that makes the cycle time longer. Much of this inferior heat transfer rate is a result of the use of laminar air flow, which through conventional teachings, provides a better rate of heat transfer than a turbulent air flow system, Methods such as U.S. Pat. No. 5,554,252 may achieve a more desirable cycle time, but the inferior method disclosed would not produce adequate heat transfer rates causing surface deformations along the adhesion bond line of the adhesively joined panel (aka bond-line read-out) because of the use of laminar air flow. Routine experimentation and optimization of U.S. Pat. No. 5,554,252 does not allow for the use of ambient air flow successfully to provide the 60-90 second cure time.

Other short comings of the current state of the art is that using conventional techniques, urethane adhesives cannot be used in SMC bonded assemblies, such as hoods and decklids that have to go thru e-coat (temperatures in excess of 205° C.). Conventional hot air bonding techniques are targeted for use in epoxy adhesives, where rapid cure chemistries (catalysts) are available, while not available for other adhesives such as urethanes. Finally, none of the present state of the art provide for contoured surfaces within the heating assembly that may be adjusted to promote, assist, or optimize air flow for a desired effect.

Thus, it would be desirable to produce a bonding apparatus that improves the surface qualities of a resulting FRP assembly and that provides uniform bonding and handling strength throughout the assembly within a short period of time, such as 60 to 90 seconds, without bond-line read-out. Further, it would be desirable to provide a bonding technique that expeditiously adheres a first FRP member to a reinforcement FRP member without affecting surface qualities or bonding strength characteristics and that have the ability to obtain adequately high temperature for SMC substrates to support these desirable characteristics.

SUMMARY OF THE INVENTION

A process for bonding a first member to a second member is provided that includes placing an uncured adhesive on a first member mating surface of the first member. The first member and the second member are supported in a spaced relationship and a second member mating surface of the second member is brought into contact with the uncured adhesive located on the first member mating surface of the first member. Pressurized air is conveyed through a manifold into contact with the first member via apertures having hole diameters of from 0.8 to 2.5 mm that are spaced apart at a distance of from 10 to 30 mm along the manifold. The pressurized air is blown in a turbulent air flow pattern at a temperature of between 150 and 315° C. and at an air pressure between 0.5 and 10 pounds per square inch (psi) over ambient pressure about outer surfaces of the first member and the second member for heat curing the adhesive. Cooler pressurized air that is below the temperature is then blown around the mating surface area while the first member and the second member are supported in the spaced relationship to achieve adhesive cure in 60 to 90 seconds and free of any bond-line read-out visible to an unaided normal human eye.

BRIEF DESCRIPTION OF THE DRAWINGS

The various advantages of the present invention will become apparent to those skilled in the art after reading the following specifications and by reference to the drawings in which.

DETAILED DESCRIPTION OF THE INVENTION

Figure 1:
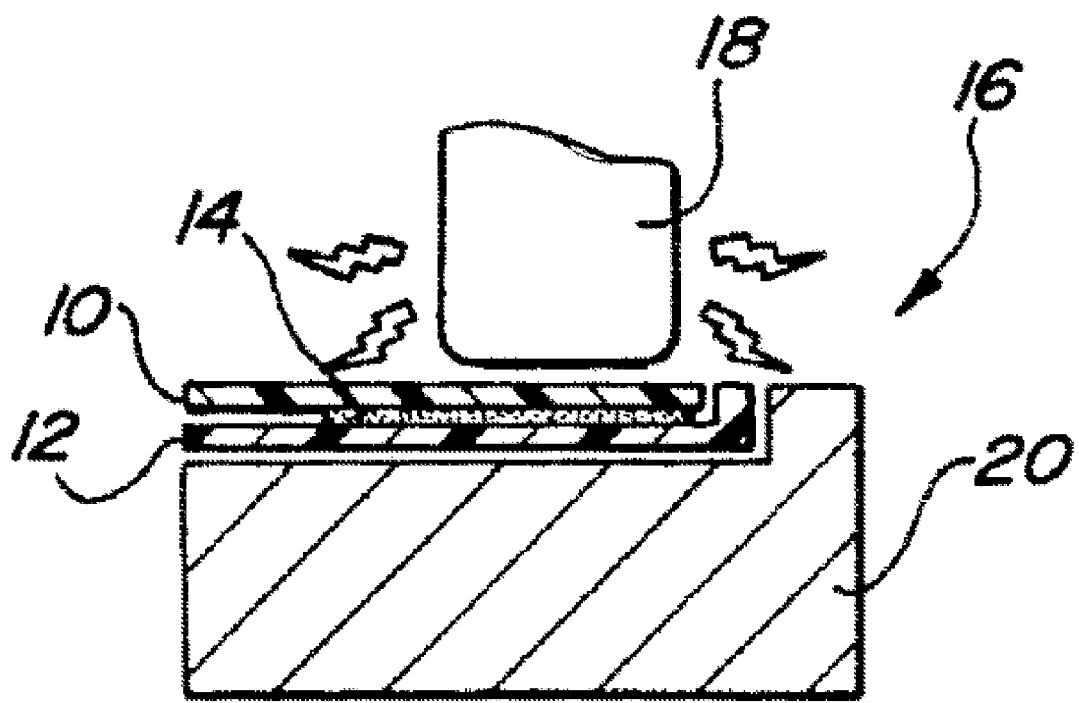
FIG. 1 is a simplified illustration of a prior art bonding apparatus.
Figure 2:
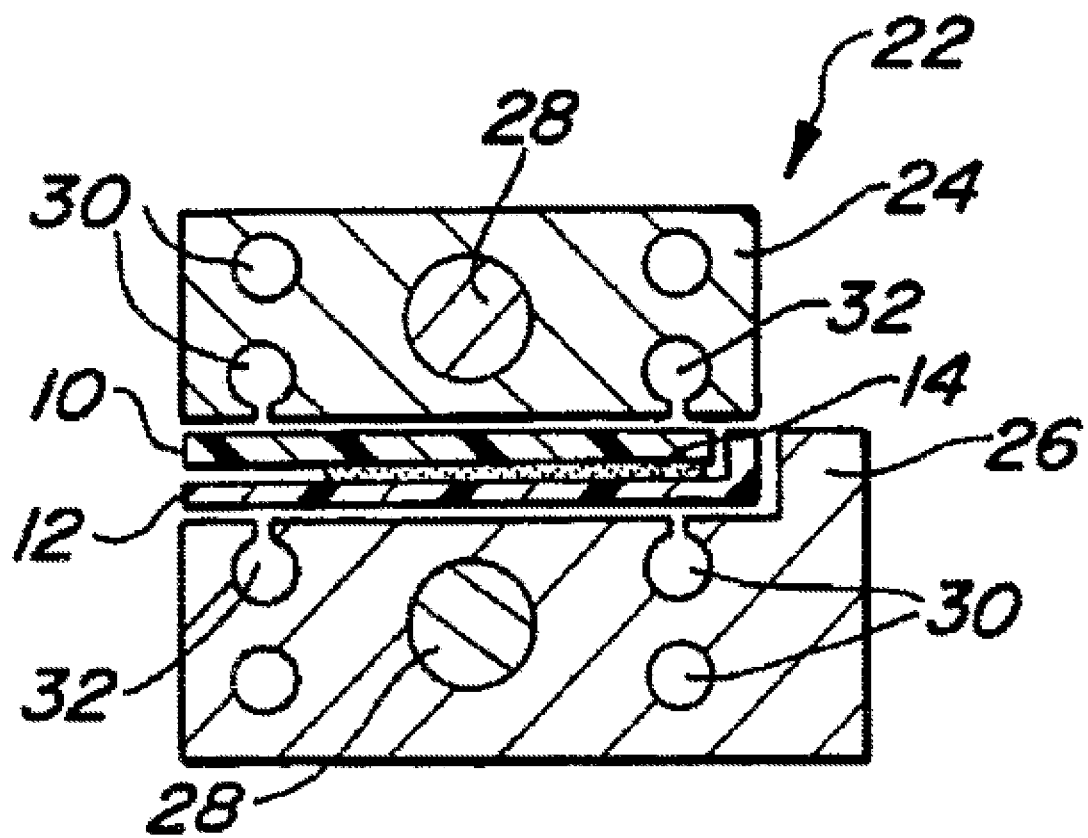
FIG. 2 is a simplified illustration of a second prior art bonding apparatus.
Figure 3:
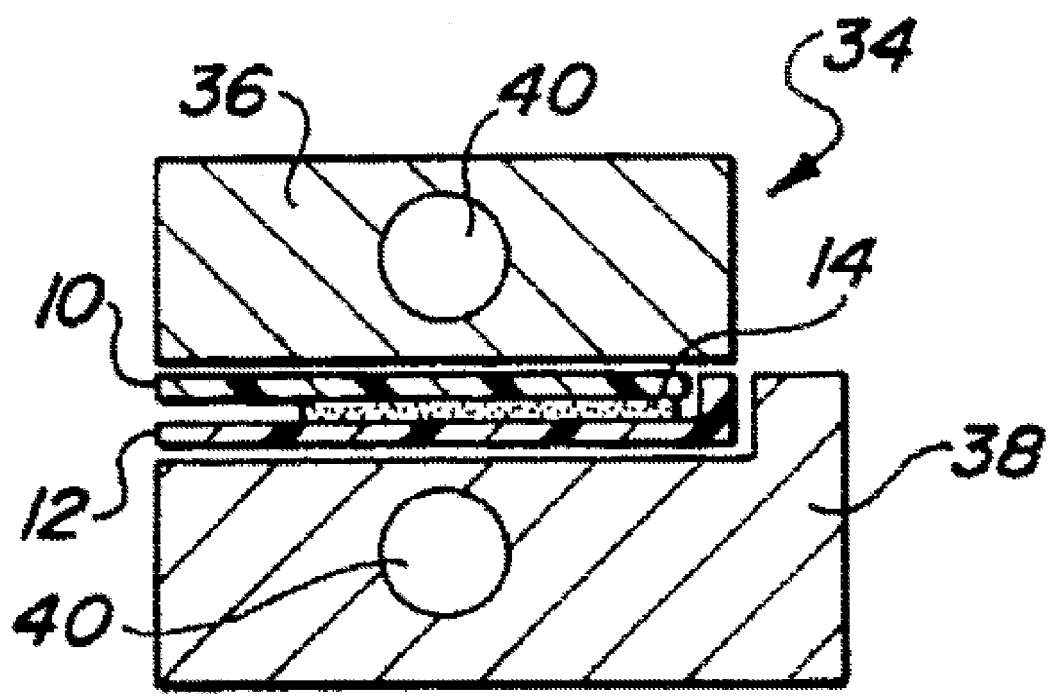
FIG. 3 is a simplified illustration of a third prior art bonding apparatus.

The present invention has utility in bonding reinforced exterior automotive body assemblies such as, but not limited to, hoods, doors, and bumper assemblies. The invention provides an apparatus and expeditious method for bonding a first, typically exterior, fiber reinforced plastic (FRP) member to a second reinforcement member, which is also preferably manufactured of a FRP material although other plastic materials or even metal may be used.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In one embodiment, the underlying bonding manifold includes of a series of holes each having a diameter of 0.8-2.5 mm spaced at a distance of 10-30 mm from one another along the bonding manifold. In this embodiment, the pressurized heated air exerts a pressure against the outer surfaces of the first member, containing an epoxy or polyurethane adhesive in need of cure, at a pressure between 0.5 to 10 psi above ambient pressure. It should be appreciated that typical ambient pressure is 14.7 psi, however in closed environments ambient pressure may vary, thus the total pressure exerted may vary, however, regulated to exert the 0.5 to 10 psi above ambient pressure. Another aspect of the present embodiment requires for the air temperature of the pressurized manifold air to be between 150 and 315° C., and in still other embodiments to an air temperature range between 230 and 290° C. The combination of these features results in a turbulent air flow that offers a surprising fast cure at bond line thicknesses of 1.5 to 3.0 mm, compared to conventional laminar flow heat bonding systems. In addition, contoured surfaces are provided which are adjustable to promote or assist with turbulent flow of said heated air.

As used herein, "turbulent air flow" is defined as air flow from a manifold as detailed herein and under conditions to have a Reynolds number (Re) of greater than 2120 and in some instances greater than 3000 and even greater than 5000.

The present invention provides a bonding process for expeditiously bonding automotive assemblies through enhanced thermal transfer to reinforced plastic (FRP) members with resort to turbulent flow heating of a bond region, contrary to the conventional wisdom that laminar air flow is best for this purpose, faster cure times and therefore higher throughput is achieved. While the present invention is described in connection with the bonding of FRP members, it will be understood that other plastic materials, composites, glass or even metal members are readily joined with a curable adhesive to form a joint with the present invention. The apparatus detailed in U.S. Pat. No. 5,554,252 is exemplary of equipment capable of high throughput air bonding of curable adhesives.

Figure 4:
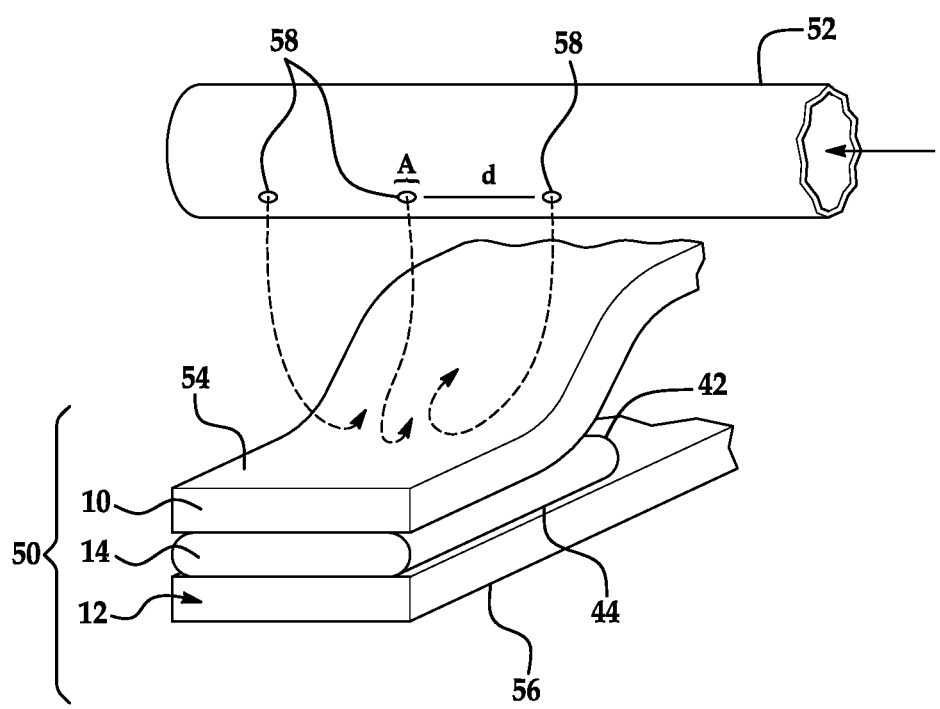
FIG. 4 is a perspective view of an assembly formed from members with an adhesive bond therebetween showing turbulent air flow under the conditions of the present invention.

In accordance with the teachings of one embodiment of this invention, bonding of a first member, typically an automotive outer skin member, to a reinforcement member is provided. An exemplary material from which an automotive outer skin member is formed is an SMC. It is appreciated that many automotive body SMC components have a high quality surface finish that is commonly referred to in the industry as a Class A surface finish. As shown with respect to FIG. 4, first member 10 and second member 12 are held in a spaced apart relationship with an uncured adhesive 14 located on the mating surface 42 of the first member 10. First and second nest members are provided for receiving and supporting the first member 10 and the second member 12, such as a structural reinforcement in a spaced relationship to control the bond-line thickness created through the cure of the adhesive 14. Relative movement of the members is controlled such that the mating surface 42 of the first member engages the corresponding mating surface 44 of the second member with the adhesive 14 therebetween to form nested members. The movement, and relative position hold of the members is controlled by vacuum assemblies that include vacuum cups. Locators ensure that the nested members 50 are in a proper position prior to being bonded.

Switchable heating and cooling assemblies (not shown) first provide pressurized heated air to the nest members 50 that in turn channel the heated air about portions of the outer surface 54 of the first member 10 through a manifold 52 with air flow being in the direction shown by the arrow. It is appreciated that a like manifold to manifold 52 underlying second member 12 to blow turbulent air onto the outer surface 56 of the second member 12 is needed to induce epoxy or polyurethane cure in 60 to 90 seconds, but is not pictured for visual clarity. After exposing the outer surfaces 54 and 56 to turbulent heated air flow to induce cure and a bond, the region is then exposed to cooler turbulent air to speed cooling of the now joined members forming an assembly that varies from the nested members 50 only in that the adhesive is now cured. The pressurized heated air heats the curable adhesive to a temperature exceeding the adhesive curing temperature, and then the pressurized cool air facilitates the cooling process for the resulting assembly.

The invention is readily used in the manufacture of an automotive assembly, however, it will be appreciated by those skilled in the art that the present invention, as defined by the appended claims, is clearly not limited to this particular application. Furthermore, the invention is described with reference to the hood assembly members being formed from FRP materials, however, it will be appreciated by those skilled in the art that the use of other plastic materials or metals is within the scope of the present invention.

The adhesive 14 typically contains a resin including non-crossed linked polymers and monomers, with a second part containing a hardener or catalyst. Epoxy resin adhesives are tolerant of e-coating and as such desirable for many automotive applications, while polyurethanes are also well suited for hot air induced bonding according to the present invention.

A manifold 52 is readily formed of steel, aluminum, metal alloys, ceramics or glass and has a generally linear series of apertures 58 that are position to impinge on the outer surface 54 with turbulent air flow. It is appreciated that double rows or more complex arrays of apertures are used with the understanding that turbulence tends to drop as a more complex array of apertures forms. The average spacing between adjacent apertures, d, is selected to be between 10 and 30 mm. The apertures 58 each have a diameter of between 0.8 and 2.5 mm. It is appreciated that shapes of the apertures can vary from the circular shape, and also include oval, rectilinear, triangular and saw cuts to form elongated slots; and still having a similar area, A, of from 0.5 to 5 mm$^2$.

Turbulent flow is also facilitated by the apertures 58 having a degree of non-uniformity across the manifold in at least one property of diameter, spacing, and bore direction. Bore direction of apertures is most often radially extending from the central axis of a tube. It is appreciated that bore directions along a chord of a circular cross-sectional manifold, or otherwise if projected not extending through the manifold center gives air flowing from such an aperture a different vector flow. The flow dynamics of a given manifold are readily modeled by finite point analysis to design a manifold that produces turbulent air flow at a given temperate and pressure to assure a Reynolds value of greater than 2200, greater than 3000 or even greater than 5000.

This heated air is supplied at a pressure within the range of 0.5 to 10 pounds per square inch above ambient and at a temperature between 150 and 315° C., and in other embodiments at an air temperature range between 230 and 290° C. This heated air is supplied for 5 to 30 seconds. It is appreciated that the flow into the manifold can also be pulsed to induce turbulent flow. Pulse rates of 5 to 500 Hertz are readily obtained with a solenoid valve. Thereafter, cooler temperature air, as is pushed through the manifold 52 to impinge upon the outer surface 54 and similarly a manifold in provided to push cooler air onto surface for 0 to 60 seconds at a pressure within the range of 0.5 to 10 pounds per square inch above ambient pressure. It should be apparent to one skilled in the art, that when the pressurized heated air impinges on the nested members, the adhesive between members 10 and 12 is heated to a temperature above curing temperature such that a bonded assembly is formed. As will be apparent to one skilled in the art, the pressure, temperature, and time period at which the hot and cool air is provided is used by way of example, and other operating parameters are within the scope of the present invention.

The foregoing discloses and describes merely exemplary embodiments of the present invention. One skilled in the art will readily recognize from such discussion, and from the accompanying drawings and claims, that various changes, modifications, and variations can be made therein without the departing from the spirit and scope of the present invention as defined by the following claims. The foregoing description is illustrative of particular embodiments of the invention, but is not meant to be a limitation upon the practice thereof. The following claims, including all equivalents thereof, are intended to define the scope of the invention.

The invention claimed is:

1. A process for bonding a first member to a second member comprising:
   placing an uncured adhesive on a first member mating surface of the first member;
   supporting the first member and the second member in a spaced relationship;
   contacting a second member mating surface of the second member with the uncured adhesive located on the first member mating surface of the first member;
   conveying pressurized air through a manifold into contract with the first member via plurality of apertures having hole diameter of 0.8-2.5 mm spaced apart at an average distance of from 10 to 30 mm along said manifold;
   impinging the pressurized air in a turbulent air flow pattern at a temperature of between 150 and 315° C. at an air pressure between 0.5 and 10 pounds per square inch (psi) over ambient pressure onto the outer surfaces of the first member or heating the adhesive, and thereafter, blowing the pressurized air that is below the temperature while the first member and the second member are supported in the spaced relationship;
   curing the uncured adhesive in 60 to 90 seconds and free of any bond-line read-out visible to an unaided normal human eye.

2. The process of claim 1, wherein the first member and the second member are held in a spaced relationship by nest structures that each include contoured surfaces respectively corresponding to contours of the outer surfaces of the first member and the second member, the outer surfaces including first and second channels extending along the length of the mating surfaces of the first member and the second member such that substantially equal air pressures are exerted against portions of the outer surfaces of the first member and the second member, and adjusting the outer surfaces to promote the turbulent air flow pattern.

3. The process of claim 1, wherein the spaced apart relationship is from 1.5 to 3 mm.

4. The process of claim 1, wherein the pressurized heated air is supplied at a temperature of between 230 and 290° C.

5. The process of claim 1 further comprising impinging on the second member outer surface with turbulent heated air for enhanced heat transfer rate to induce cure of said curable adhesive.

6. The process of claim 1, wherein the first member is an automotive body panel.

7. The process of claim 1, wherein the second member is a reinforcement structural member.

8. The process of claim 1, wherein the first member is a fiber reinforced plastic Class A surface member.

9. The process of claim 1, further comprising pulsing the pressurized air.

10. The process of claim 9, wherein the pressurized air is pulsed at a rate of 5 to 500 Hertz.

11. The process of claim 1 wherein said plurality of apertures varies in at least one property of adjacent aperture spacing, aperture shape, aperture diameter, or aperture bore direction.

12. The process of claim 11 wherein at least one of said plurality of apertures has the aperture bore direction that does not extend through a central axis of said manifold.

13. The process of claim 11 wherein at least one of said plurality of apertures is a slot.

* * * * *